US012724770B2

(12) United States Patent
Huang et al.

(10) Patent No.: US 12,724,770 B2
(45) Date of Patent: Sep. 1, 2026

(54) AUTONOMOUS COLUMN SELECTION FOR COLUMNAR CACHE

(71) Applicant: Google LLC, Mountain View, CA (US)

(72) Inventors: Haoyu Huang, Sunnyvale, CA (US); Gaurav Jain, Los Altos, CA (US); Xun Cheng, Dublin, CA (US); Viral Shah, Cupertino, CA (US); Eugene Brevdo, Burlingame, CA (US); Lyric Pankaj Doshi, San Mateo, CA (US)

(73) Assignee: Google LLC, Mountain View, CA (US)

( * ) Notice: Subject to any disclaimer, the term of this patent is extended or adjusted under 35 U.S.C. 154(b) by 378 days.

(21) Appl. No.: 17/523,520

(22) Filed: Nov. 10, 2021

(65) Prior Publication Data

US 2023/0141891 A1 May 11, 2023

(51) Int. Cl.

*G06F 16/00* (2019.01)
*G06F 16/22* (2019.01)
*G06F 16/2453* (2019.01)
*G06F 16/2455* (2019.01)

(52) U.S. Cl.

CPC ...... *G06F 16/24539* (2019.01); *G06F 16/221* (2019.01); *G06F 16/2264* (2019.01); *G06F 16/24552* (2019.01)

(58) Field of Classification Search

CPC ............. G06F 16/24539; G06F 16/221; G06F 16/2264; G06F 16/24552; G06F 16/283; G06F 16/217; G06F 2201/80; G06F 2201/885; G06F 11/3409

See application file for complete search history.

(56) References Cited

U.S. PATENT DOCUMENTS

| | | | | |
|---|---|---|---|---|
| 11,093,496 | B1 * | 8/2021 | Bhatia | G06F 16/24552 |
| 11,275,684 | B1 * | 3/2022 | Sosseh | G06F 12/0802 |
| 11,853,301 | B1 * | 12/2023 | Pandis | G06F 16/24561 |
| 2012/0047126 | A1 | 2/2012 | Branscome et al. | |
| 2013/0185475 | A1 * | 7/2013 | Talagala | G06F 12/0866 711/102 |

(Continued)

OTHER PUBLICATIONS

Rivenes, A., “Columnar Formats in Exadata Flash Cache”, Oracle Database in-Memory, Oct. 30, 2017, retrieved from the internet <https://blogs.oracle.com/in-memory/post/columnar-formats-in-exadata-flash-cache>, 3 pages.

(Continued)

*Primary Examiner* — Paul Kim
(74) *Attorney, Agent, or Firm* — Lerner David LLP

(57) ABSTRACT

Aspects of the disclosure are directed to generating cache configurations for caching data for a database. A database management system (DBMS) can search for column data to cache in a database cache to improve performance of the DBMS in resolving queries. Column data selection can be performed automatically and in the background of a deployed DBMS. Periodically, the DBMS can assess the performance benefit of having certain data cached in the database cache and select data for caching based on the assessed performance benefit. The DBMS can also determine the performance benefit of cached data when not cached, as well as select some portions of data to cache over others. The DBMS can also select data for caching based on different degrees of compression, to further improve query resolution performance.

20 Claims, 8 Drawing Sheets

(56) References Cited

U.S. PATENT DOCUMENTS

| | | | | |
|---|---|---|---|---|
| 2016/0092134 | A1* | 3/2016 | Raitto | G06F 16/283 711/170 |
| 2016/0342654 | A1* | 11/2016 | Bendel | G06F 16/24565 |
| 2018/0336199 | A1* | 11/2018 | Ignatyev | G06F 9/4494 |
| 2020/0065424 | A1 | 2/2020 | Ananthapur Bache et al. | |
| 2020/0125582 | A1* | 4/2020 | O'Shaughnessy | G06F 16/245 |

OTHER PUBLICATIONS

"Columnar and Row-Based Data Storage", SAP Help Portal, retrieved from the internet on Nov. 8, 2021<https://help.sap.com/viewer/6b94445c94ae495c83a19646e7c3fd56/2.0.01/en-US/bd2e9b88bb571014b5b7a628fca2a132.html>, 5 pages.

Graefe, G., "Volcano—An Extensible and Parallel Query Evaluation System", IEEE Transactions on Knowledge and Data Engineeringvol. 6, Issue 1, Feb. 1994, pp. 120-135, retrieved from the internet Nov. 9, 2021, <https://doi.org/10.1109/69.273032>, 4 pages.

"Oracle Database In-Memory Advisor", retrieved from the internet on Nov. 10, 2021, <https://www.oracle.com/database/technologies/inmemory-advisor.html>, 3 pages.

"Using the NSE Advisor with SQL Commands for Warm Data Recommendations", Retrieved from the internet on Nov. 10, 2021, <https://help.sap.com/viewer/6b94445c94ae495c83a19646e7c3fd56/2.0.04/en-US/0ad518d33a174f7c8a888db109795f59.html>, 4 pages.

Yoshimura et al. Column Cache: Buffer Cache for Columnar Storage on HDFS. 2018 IEEE International Conference On Big Data (Big Data), IEEE, Dec. 10, 2018 (Dec. 10, 2018), pp. 282-291.

International Search Report and Written Opinion for International Application No. PCT/US2022/049407 dated Feb. 24, 2023. 13 pages.

Office Action for European Patent Application No. 22830639.5 dated Apr. 13, 2026. 6 pages.

* cited by examiner

400

Receive column data corresponding to sampled queries. 410

Generate distinct column sets from the received column data. 420

Generate membership mapping between column and column sets 430

Search for a cache configuration with the highest overall performance benefit, subject to one or more constraints including a database cache memory constraint. 440

AUTONOMOUS COLUMN SELECTION FOR COLUMNAR CACHE

BACKGROUND

A database management system (DBMS) is a system that manages databases and handles receiving and resolving queries to the managed databases. A DBMS can manage tables, including the relations of data forming part of a database. The DBMS can read and write to individual rows or columns of the managed tables. In addition, the DBMS can update, delete, and add records to a managed database.

A DBMS can implement a cache for temporarily storing database data. The cache can store blocks of data representing rows of a base database table. Data in the cache can be stored in column-major or row-major format. Elements of a table stored in column-major format are stored contiguously in memory by column, while elements stored in row-major format are stored contiguously in memory by row. A database cache in which data is stored in column-major format is a columnar cache.

BRIEF SUMMARY

Aspects of the disclosure are directed to generating cache configurations for caching data for a database. A database management system (DBMS) can search for column data to cache in a database cache to improve performance of the DBMS in resolving queries. Column data selection can be performed automatically and in the background of a deployed DBMS. Periodically, the DBMS can assess the performance benefit of having certain data cached in the database cache and select data for caching based on the assessed performance benefit. The DBMS can also determine the performance benefit of cached data when not cached, as well as select some portions of data to cache over others. The DBMS can also select data for caching based on different degrees of compression, to further improve query resolution performance.

An aspect of the disclosure includes a system including one or more processors configured to: receive a query specifying one or more groups of data along a first dimension of a plurality of dimensions; process the query to retrieve the one or more groups of data specified in the query, from one or both of a database cache and one or more storage devices; generate, for the query, values for one or more performance metrics in processing the query when the one or more groups of data are cached in the database cache; and load at least a portion of the one or more groups of data specified in the query into the database cache, based on the values of the one or more performance metrics.

An aspect of the disclosure includes a computer-implemented method, including: receiving, by a system including one or more processors, a query specifying one or more groups of data along a first dimension of a plurality of dimensions; processing, by the system, the query to retrieve the one or more groups of data specified in the query, from one or both of a database cache and one or more storage devices of the system, one or both of the database cache and the one or more storage devices storing tables having a plurality of dimensions; generating, for the query and by the system, values for one or more performance metrics in processing the query when the one or more groups of data are cached in the database cache; and loading, by the system, at least a portion of the one or more groups of data specified in the query into the database cache, based on the values of the one or more performance metrics.

An aspect of the disclosure includes one or more non-transitory computer-readable storage media storing instructions that when executed by a system including one or more processors, cause the system to perform operations including: receiving a query specifying one or more groups of data along a first dimension of a plurality of dimensions; processing the query to retrieve the one or more groups of data specified in the query, from one or both of a database cache and one or more storage devices storing tables having a plurality of dimensions; generating, for the query, values for one or more performance metrics in processing the query when the one or more groups of data are cached in the database cache; and loading at least a portion of the one or more groups of data specified in the query into the database cache, based on the values of the one or more performance metrics.

Aspects of the disclosure can include one or more of the following features, alone or in combination. In some examples, aspects of the disclosure provide for all of the following features, together in combination.

The one or more groups of data are part of a first set of data represented as a cache configuration; and wherein the one or more processors are further configured to identify the cache configuration from candidate sets of data, each candidate cache configuration including respective one or more groups of data along the first dimension.

In identifying the cache configuration, the one or more processors are further configured to search the candidate cache configurations for the first set of data subject to the one or more performance criteria.

Respective data represented by each of the candidate cache configurations, when cached in the database cache, consumes a respective amount of memory equal to or less than a memory capacity of the database cache.

The one or more performance criteria include identifying the maximum- or the minimum-valued set of data based on respective values of the one or more performance metrics for each group of data in the identified set.

The query received is part of a plurality of received queries; and wherein the one or more processors are further configured to: sample queries from the plurality of queries; receive respective first values for the one or more performance metrics for the sampled queries when respective one or more groups of data for the sampled queries are retrieved from the database; generate, for respective one or more groups of data for each sampled query, respective second values for the one or more performance metrics in processing the sampled query when the respective one or more groups of data specified by the sampled query are cached in the database cache; and determine, for each sampled query, a respective performance benefit for the respective one or more groups of data specified in the sampled query, based on respective first and second values for the sampled query.

In loading at least, a portion of the one or more groups of data specified in the query into the database cache, based on the values of the one or more performance metrics, the one or more processors are further configured to generate a cache configuration representing one or more selected groups of data, the groups of data selected based on the respective performance benefit for each of the one or more selected groups of data.

The one or more groups of data are columns; and wherein to generate the cache configuration, the one or more processors are configured to: receive column data corresponding to sampled queries; generate distinct column sets from the received column data; generate a membership map between column sets and columns in the column sets; and use the membership map to search for a cache configuration with the highest overall performance benefit of columns in the cache configuration, subject to one or more constraints including a database cache memory constraint.

The one or more performance metrics correspond to one or more of: an amount of time between receiving the query by the one or more processors and delivering a response to the query, the number of processing cycles by the one or more processors to resolve the query, and the number of operations performed by the one or more processors to resolve the query.

In generating the values for the one or more performance metrics, the one or more processors are configured to generate a query execution plan for executing the query when the one or more groups of data for the query are stored in the database cache.

In generating, for the query, the values for the one or more performance metrics, the one or more processors are further configured to: maintain data corresponding to the one or more invalidated blocks in a table of the database queried as part of the one or more groups of data; estimate a refresh time for refreshing the one or more invalidated blocks in the database cache; and generate, for the query, the values for the one or more performance metrics in accordance with the maintained data and estimated refresh time.

The first dimension is a column dimension for tables in the database, wherein data in the database cache is stored along the column dimension, and wherein data in the one or more storage devices is stored along a row dimension for the tables in the database.

In loading the one or more groups of data into the database cache, the one or more processors are further configured to compress each of the one or more groups of data according to one or more compression levels before loading the one or more groups of data into the database cache; and wherein the one or more processors are further configured to generate the one or more values for the one or more performance metrics in processing the query when each of one or more groups of data are cached in the database cache and compressed according to a respective compression level.

In generating the values for the one or more performance metrics, the one or more processors are further configured to: determine a first group of data of the one or more groups of data in the database cache; and generate, for the query, values for the one or more performance metrics when the first group of data is not cached in the database cache.

In loading at least the portion of the one or more groups of data, the one or more processors are further configured to: determine, for a first group of data, whether the group of data meets a threshold quantity of valid blocks of data; and in response to the determination that the first group of data does meet the threshold quantity, load a portion of the first group of data to the database cache that does not include invalidated blocks.

In generating the values for the one or more performance metrics, the one or more processors are further configured to: track a respective rate of access of portions of the one or more groups of data in the one or more storage devices; and generate, for the query, the values for the one or more performance metrics in accordance with a rate of access of a portion of data specified in the query.

DETAILED DESCRIPTION

Overview

Figure 1:
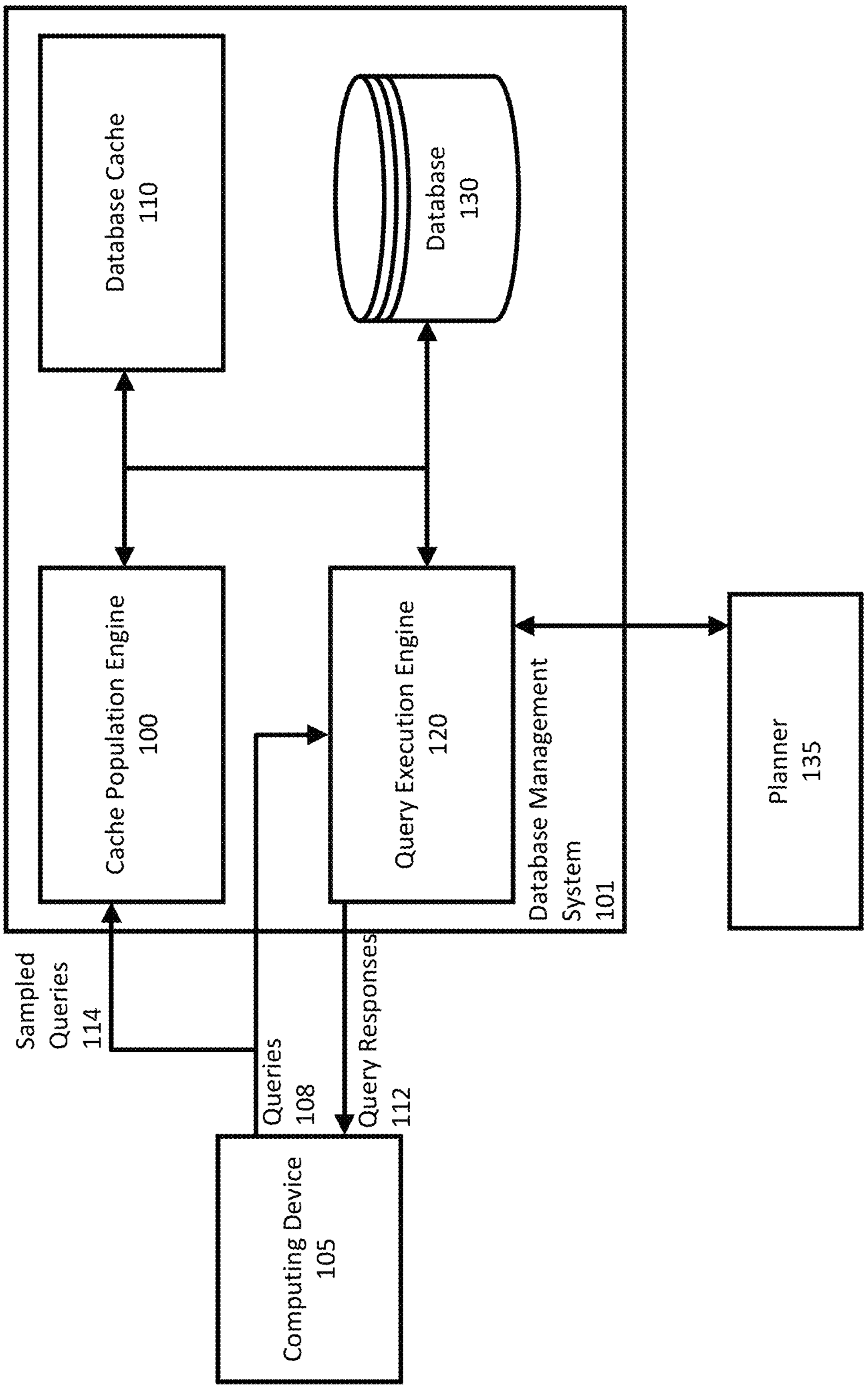
FIG. 1 is a block diagram of an example DBMS implementing an example cache population engine, according to aspects of the disclosure.

Aspects of the disclosure are directed to generating cache configurations for caching data for a database. A database management system (DBMS) can maintain the database over one or more storage devices, such as hard drives or solid-state drives. The DBMS can implement a cache population engine, configured to monitor database queries and, using monitored queries and responses to those queries, generate a cache configuration.

A cache configuration is a data structure specifying what data from the database is populated in the cache. The DBMS as described herein generates the cache configuration based on the performance of the DBMS in resolving queries when different groups of data, such as columns of data, are cached. A DBMS selects columns of data for caching, which are represented in a cache configuration. As described herein, the DBMS can autonomously select data to populate a database cache to improve performance of a workload executed on the DBMS.

The cache population engine samples queries to the database, analyzes the queries, and based on the analysis of the queries selects columns referenced in the queries for caching into the database cache. A query can specify sets of columns to be read from tables or relations of the database. Each column set is a collection of columns from the same relation or table. A query can be resolved faster if the specified column sets are available in the database cache, as opposed to in slower storage like disc storage.

A column set is a collection of columns. Although the specification describes columnar caches and selecting columns for caching, it is understood that the cache configuration of the DBMS is configured to automatically select groups of data for populating a database cache. A group of data can include a row or column from a relation or table, the row or column having data elements.

To generate the cache configuration, the cache population engine samples queries to the database specifying different column sets and estimates the performance of the DBMS in resolving the sampled queries when the different column sets are cached. The cache population engine can receive query execution plans specifying operations to be performed by the DBMS to query the database when different column sets are cached. These execution plans can be programmatically analyzed and generated from existing DBMS functionality, for example using "what-if?" analysis provided in some DBMSs. The performance of the DBMS under the generated query execution plans can be measured quantitatively. For example, the performance can be measured in an estimated amount of time between query receipt and a delivered response or based on the number of processing cycles or operations performed by the DBMS to resolve the query.

These and other performance metrics can be used to generate the "performance benefit" of the column set when cached. The performance benefit of a column set represents the relative improvement of the DBMS, for example in computational cost or execution time, by having the column or column set in the cache as opposed to being stored on disk. The performance benefit can be a function of performance metric values for a column set when not cached, and performance metric values for the column set or column, when cached. In some examples the performance benefit is calculated per query, instead of per-column set. In those examples, as described herein with reference to FIG. 4, the performance benefit can be the sum of the performance benefit of each column set derived from a query.

After the cache population engine generates performance estimates of the DBMS for each column set of the sampled queries, the cache population engine can search the different column sets from the sampled queries to identify a cache configuration with the highest performance benefit to the DBMS, based on a number of objectives. The search can be modeled as a mixed-integer programming problem, with a set of discrete integer constraints. The cache population engine can search for the column sets to include in the cache configuration to improve the performance query resolution of a workload.

Queries to the database can be part of a workload executed on the DBMS. Workloads handled by the DBMS can be added, removed, or changed over time. Different workloads may include querying the DBMS for different column sets, and at different rates or volumes of queries. Changes in the workloads can affect the performance of the DBMS if the current cache configuration is not updated to reflect these changes. Therefore, the cache population engine can periodically or continuously sample queries and generate new cache configurations. The cache population engine can apply those cache configurations by loading certain column sets into the database cache corresponding to a higher performance benefit for the currently executed workloads.

The cache population engine can also include a number of other features for selecting column data to cache, to further improve the performance of the DBMS while executing a workload. For example, before populating the cache, the DBMS can simulate invalid blocks during estimation of the performance benefit of caching different column sets. The performance benefit for caching column sets, particularly column sets with many invalid blocks, can be more accurately determined through the simulation of invalid blocks, as described herein.

In some examples, the DBMS can estimate the performance benefit of removing column sets already populated in the database cache, in addition or as an alternative to estimating the performance benefit of adding column sets into the cache.

In some examples, the DBMS can compress column data before caching, according to different compression levels. The DBMS can select column sets for caching while also specifying different compression levels for each column in a set.

In some examples, the DBMS can select portions of columns, instead of entire columns, for caching. For example, the DBMS can determine skewed access patterns, in which portions of column data are more heavily accessed during execution of a workload. In addition, or alternatively, the DBMS can cache portions of column data with predominately more valid blocks than invalid blocks.

Aspects of the disclosure provide for a number of technical advantages. Autonomous column data selection for populating a database cache can lower response times of a DBMS resolving a number of received queries. The DBMS can consume less memory through a search process described herein for identifying groups of data, such as columns, resulting in the highest performance benefit of the DBMS in executing queries when populated in the cache. The DBMS consumes less memory over other search approaches, and also reduces the search space of a search by representing workloads as column sets.

A DBMS can generate cache configurations per-workload, flexibly re-evaluating different configurations of a cache, to generate workload-specific configurations and improve performance overall by lowering response times during query resolution. Column selection on a DBMS as described herein can adapt to different types of data processed in different workloads and operate periodically or on-demand In this way, the DBMS can also adapt to varying factors of different workloads executed on the DBMS.

On the same workload, the DBMS can identify column data to populate in the database cache, as the same workload handles different types of data over time. For example, if the DBMS updates the cache once a day with a new selection of column data represented in a cache configuration, the DBMS can adapt the selection to reflect more commonly used sources of data for the workload, even when initial configurations did not cache much or any of these sources of data when the workload was initiated.

Memory overhead required for column selection as described herein is small relative to data consumed by a workload. For example, data tracking column sets, hypothetical relations and hypothetical columnar units as described herein, can consume less than 512 kilobytes for a 10-gigabyte database. What-if analysis and query sampling also exhibit small compute overhead, measured for example in CPU usage, versus other processes running as part of query resolution on a DBMS. Memory and compute consumption can be further reduced when columnar units or subsets of groups of data are selected for population, particularly when the DBMS determines that the access pattern of a database is skewed or only column data with large numbers of valid blocks are selected for population.

Example Systems

FIG. 1 is a block diagram of an example DBMS 101 implementing an example cache population engine 100, according to aspects of the disclosure. The DBMS 101 can be implemented on one or more computing devices in one or more physical locations. For example, the DBMS 101 can be configured for managing data on a computing platform of computing devices, which may include a number of computing devices and/or storage devices.

The DBMS 101 can include the cache population engine 100, a database cache 110, a query execution engine 120, and a database 130. The cache population engine 100, as described herein with reference to FIGS. 3-5, generates a cache configuration specifying how data stored in the database 130 is to be cached into the database cache 110.

The DBMS 101 can communicate with one or more computing devices, such as computing device 105. As described herein with reference to FIG. 7, the DBMS 101, and the computing device 105 can communicate over a network and/or any of a variety of different types of wired or wireless connections. In some examples, the computing device 105 is operated at least sometimes by a user. In the same or other examples, the computing device 105 communicates automatically with the DBMS 101, for example as part of executing a computer program, script, or hardware/firmware operations the computing device 105 is configured to perform.

The computing device 105 can be any of a variety of computing devices configured for querying a database. For example, the computing device 105 can be a personal laptop, a server, a wearable device, a sensor, etc. The computing device 105 can be user-operated and include peripherals or other components for receiving user input. In other examples, the computing device 105 is configured to automatically communicate with the DBMS 101, for example as part of a computer program executed by the computing device 105.

The computing device 105 can be an intermediary device between the DBMS 101 and other computing devices (not shown). For example, the computing device 105 can be a local device configured to perform operations that rely in part on queries and responses to and from the DBMS 101. In turn, the computing device 105 may receive and respond to requests for data and/or to perform some operations, using the data.

The database cache 110 can be implemented using any of a variety of different cache technologies, such as L2 cache or L3 cache. The database cache 110 can also be implemented as volatile memory devices, such as various combinations of RAM devices, including SRAM and DRAM devices.

In some examples, the DBMS 101 can be a hybrid transactional and analytical processing system (HTAP). An HTAP system is a database management system configured to perform both online transaction processing (OTAP) and online analytical processing (OLAP). OTAP systems are configured to coordinate and execute transactions between communicating computing devices. Transactions are recorded and updated in a corresponding database managed by an OTAP system. OLAP systems are configured to receive and resolve queries to a database used as part of analysis of data stored in the database. OLAP and OTAP systems are separately optimized for their respective use cases, with OLAP systems generally optimized for read-only access of data, and OTAP systems optimized for read and write access of queried data.

To improve the performance of query resolution, the DBMS 101 can implement the database cache 110. In some examples, the database cache 110 is a columnar cache. Queries to OLAP systems and HTAP systems supporting OLAP may include requests for data referenced by columns of tables in the database, as opposed to references to individual rows, which is more common in OTAP.

The DBMS 101 can be configured to reference and manipulate data in row-major format, but also implement a columnar cache storing column data in column-major format. Column-major formatted data can speed up the execution of some queries, for example in systems in which columns of tables are queried more often than individual rows or records of tables.

The database 130 is a collection of tables or relations storing data along multiple dimensions. For example, a table of the database 130 can store data along rows and columns of the table. The database 130 can be implemented on storage devices, such as directed attached storage devices, including solid state drives, hard drives, flash drives, network attached storage devices, arrays of various combinations of different or the same storage devices, etc.

The query execution engine 120 is configured to receive queries 108 and generate query responses 112. The queries 108 can be part of a workload executed by the computing device 105, or some other device not shown. A workload can refer to one or more computer programs or scripts that include operations for querying the DBMS 101 for data. A workload can be automatic and on-going, or executed during pre-programmed intervals of time. In other examples, a workload is executed on-demand by the computing device 105, for example in response to user input to the device 105.

A query to the DBMS 101 can include data specifying columns of data to be retrieved from the DBMS 101. The specified data may be stored in the database cache 110 or in the database 130 at the time of execution. The query execution engine 120 is configured to retrieve the queried data specified in a given query and return the data as part of a query response.

The DBMS 101, as part of resolving the query, is configured to generate a query execution plan. The DBMS 101 can include a planner 135, or in some examples such as shown in FIG. 1, communicate with a planner 135 external to the DBMS 101. The planner 135 can generate a query execution plan according to any of a variety of different processes. As part of generating the query execution plan, the planner 135 can parse a received query and select corresponding query operations to execute according to the plan, based on a number of predetermined criteria. The predetermined criteria can be, for example, based on efficient use of compute or storage resources, number of operations to perform, total time to execute the query, user input specifying certain types of operations to perform, etc.

The query execution plan can be represented as a collection of connected plan nodes, for example as part of a graph or tree. Each plan node can represent operations that are performed by the query execution engine 120 as part of resolving the query. For example, different plan nodes can correspond to different types of scanning operations, such as sequential scan or index scan. Other plan nodes can connect plan nodes for scanning operations, such as plan nodes representing join operations for combining the results of different executed scans in response to the query. The query execution plan can show how various tables holding some or all of the queried data will be scanned to retrieve the queried data, as well as how the results of the scan operations are to be combined to generate a query response.

The planner 135 can generate a query execution plan according to any of a variety of approaches. The cache population engine 100 is configured to process plans to determine performance metrics corresponding to the execution of those plans, when certain subsets of column data is cached in the database cache 110. For example, performance metrics can be measured in terms of clock time to resolve the query, or in the number of processing cycles or operations needed to resolve the query. As part of generating the query execution plan, the planner 135 can parse a received query and select corresponding query operations to execute according to the plan, based on a number of predetermined criteria. The predetermined criteria can be, for example, based on efficient use of compute or storage resources, number of operations to perform, total time to execute the query, user input specifying certain types of operations to perform, etc.

The planner 135 receives and parses a query to generate a query execution plan. The query execution plan represents query operations and an order in which the query operations are to be performed by the DBMS 101 to execute the query.

A query operation refers to an action performed by the query execution engine 120 as part of executing or resolving the received query. A query operation can include reading or writing data from and to memory, performing arithmetic or logic calculations, performing a respective process for sorting, hashing, joining, and scanning data, etc. The query execution plan can be a directed graph, such as a tree, of nodes representing different operations to be performed by the DBMS as part of executing the query. The query execution plan can also be represented as an ordered list or array of operations, based on the order in which the operations of the plan must be executed to correctly execute the received and parsed query.

Query responses 112 generated by the query execution engine 120 are returned to the computing device 105. In some examples, query responses 112 can be returned to another destination computing device (not shown) that can be specified as a destination by the computing device 105. The computing device 105 can proceed to process the query responses 112 as part of a downstream process, which may include subsequent queries to the DBMS 101 as part of the same or a different workload.

The cache population engine 100 receives sampled queries 114 from the queries 108 of the executed workload. As described herein with reference to FIGS. 3-5, the cache population engine 100 estimates the performance of executing the sampled queries 114 according to different cache configurations of the database cache 110. The cache population engine 100 loads corresponding data into the cache 110 based on which cache configuration results in the highest performance of the DBMS 101 in resolving the queries 108. In this way, the query execution engine 120 can resolve queries faster, on average, because the cache population engine 100 selects data to be cached with the objectives of reducing query time and raising computational efficiency, measured for example by fewer processing cycles and/or operations performed during query resolution. Individual columns, column sets, and/or cache configurations of column sets can be represented by a respective performance benefit.

The cache population engine 100 is configured to periodically sample additional queries and update the database cache 110 according to a new cache configuration. Initiating a cache configuration update can be in response to satisfying predetermined criteria. These criteria can include, for example, an amount of time passing since the last database cache update, and/or the initiation of execution of a new workload. In these or other examples, the cache population engine 100 updates the database cache 110 in response to receiving an input, for example user input from the computing device 105.

Predetermined criteria for initiating a cache configuration update can also be based on the passage of time. For example, the cache population engine 100 can trigger a cache configuration update every 24 hours.

The predetermined criteria for initiating a database cache update can be adjusted and modified, for example in accordance with user input through an interface between the computing device 105 and the DBMS 101. The interface can be, for example, calls to an API, and/or a web or application interface through a user interface or graphical user interface.

The DBMS 101 can communicate data between the computing device 105 and/or another computing device (not shown), using an interface, such as a graphic user instance, displayed on a display of the computing device 105. The interface can include a number of user-interactable elements, such as buttons, toggles, sliders, checkboxes, etc., for modifying the behavior of the DBMS 101 and/or displaying certain types of information, described presently. In other examples, the interface can include an API exposing the DBMS 101 for modifying different parameters related to the functionality of the DBMS 101, such as cache configuration, according to calls to the API.

For example, the interface can include a toggle box or other user-interactable element for enabling or disabling automatic population of the database cache 110 by the cache population engine 100. In some examples, if automatic population is enabled, the interface can prompt the user to manage settings related to automatic population, such as its frequency of occurrence or setting a schedule for when the cache population engine 100 is to update the database cache 110 according to a new cache configuration.

In other examples, such as when automatic population is disabled, the interface can provide options to a user for modifying which columns should or should not be cached in the database cache 110. Another user-interactable element can cause the cache population engine 100 to populate the database cache 110 if not currently populated, or to update the database cache 110 according to a new cache configuration when the cache 110 is currently populated.

In other examples, other settings can be adjusted through the interface. For example, the interface can receive input that causes the cache population engine 100 to adjust the time interval between consecutive updates to the database cache 110. Other input to the interface can cause the cache population engine 100 to reset calculated performance metrics, and/or apply an exponential decay on the performance benefit measured for column sets after they have been loaded into the database cache 110.

The interface can generate various visualizations of the data queried as part of a workload, and/or the columns of data populated in the database cache 110. Each column populated in the database cache 110 can correspond to a respective user-interactable element on the interface and for toggling the inclusion or exclusion of the column in the database cache 110. The interface can also provide the performance benefit of the current cache configuration, and/or individual performance metrics used to measure the benefit for each column set as part of a cache configuration. In some examples, performance metrics are generated and stored only while the cache population engine 100 is generating a cache configuration.

In yet further examples, the interface can be configured to receive input for causing the cache population engine 100 to generate cache configurations according to different database cache sizes. In some examples, a computing device accessing the system 101 through the interface may only be allocated a subset of the total available database cache memory available on the system 101. In some examples, the system 101 can generate cache configurations specifying which columns or column sets would be populated in the database cache 110, without actually populating the database cache 110. These various cache configurations can be compared and chosen, for example automatically by the cache population engine 100 or through user input to the interface between the computing device 105 and the system 101.

In yet further examples, the user interface can present the queries and related information from a workload. The user interface can receive input for specifying which queries should be sampled by the cache population engine 100, instead of purely random sampling.

Figure 2:
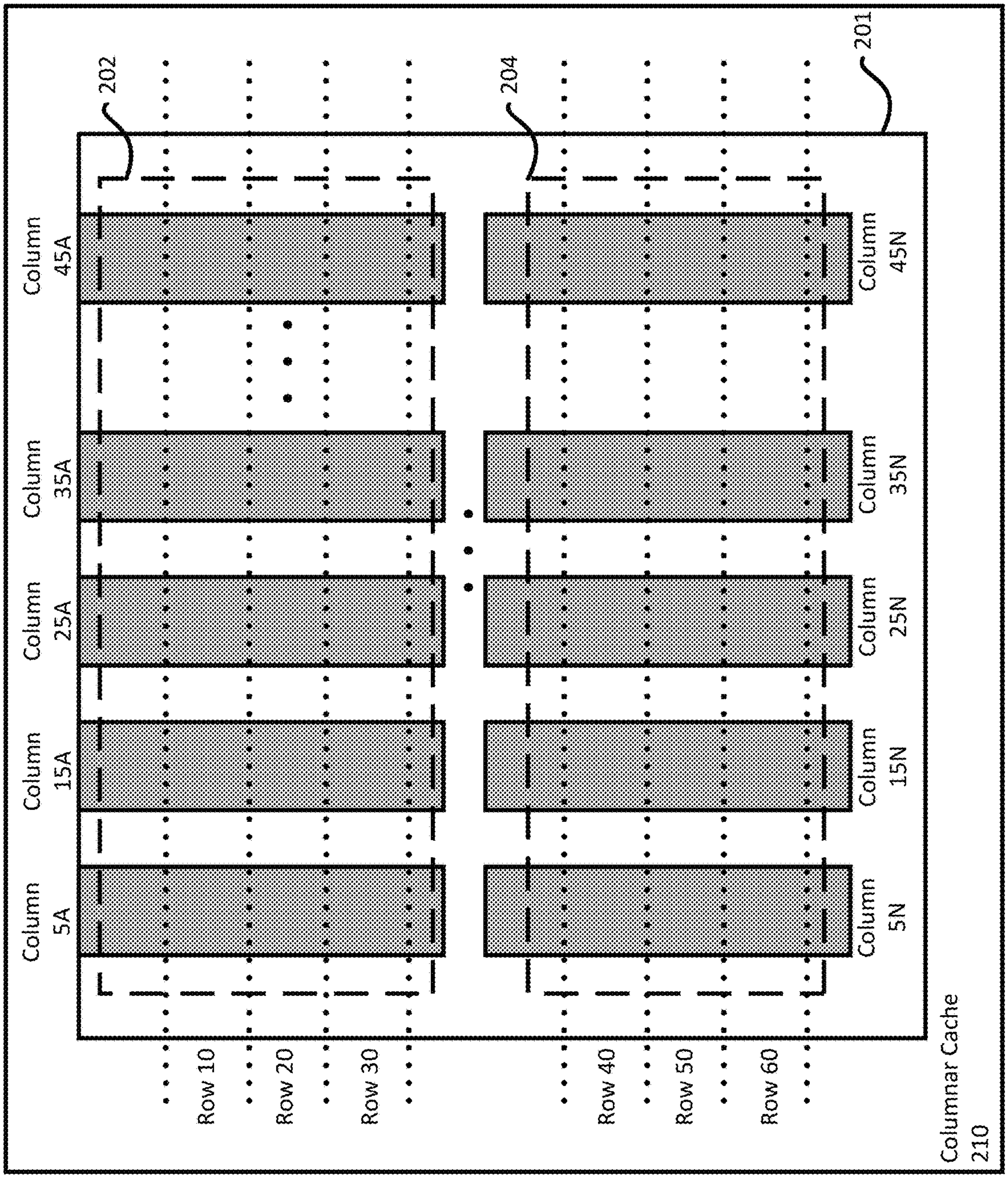
FIG. 2 is a block diagram of an example columnar cache with cached data.

FIG. 2 is a block diagram of an example columnar cache 210 with cached data. In FIG. 2, the columnar cache 210 is shown as caching portions of a database table 201. Columns 5A, N, 15A, N, 25A, N, 35A, N, and 45A, N in the columnar cache 210 can be referenced using a respective columnar unit index and a row index. A column in a columnar unit can be the entire column from a database table, or a portion of a column in the database table.

Each columnar unit 202, 204 has a respective index. Within each columnar unit, each row of the columnar unit has a respective row index. For example, columnar unit 202 and columnar unit 204 have respective columnar unit indices, for example 202 and 204. Each row, such as row 10, row 20, and row 30, of columnar unit 202 can be referenced according to a respective row index. Similarly, rows 40, 50, and 60 can be referenced according to a respective row index. The size of each columnar unit can be measured in blocks of data. The number of blocks for a columnar unit can vary from implementation-to-implementation, for example 4096 blocks each.

A valid block in the columnar cache 210 is up to date with corresponding data in a base table for the block in the cache 210. When the corresponding data in the base table is updated, for example overwritten or deleted, the block in the columnar cache 210 representing the updated data is invalid or has become invalidated. When a block is invalidated, the DBMS must perform a row-store operation to read the updated contents of the base table, instead of using a more computationally efficient operation to retrieve the data from the cache 210. The DBMS 101 can implement any of a variety of approaches for maintaining cache coherence between the cache and database tables, and blocks of memory can be flagged as "invalid" or "valid" bits to identify the blocks as valid or invalid.

The columnar cache 210 can include any of a variety of different types of memory devices used for caching data. For example, the columnar cache can be implemented in main memory, such as RAM or DRAM. In addition, or alternatively, the columnar cache 210 can be implemented in persistent storage, such as on a solid-state drive or on a hard drive.

Example Methods

Autonomous Column Selection for Populating Columnar Cache

Figure 3:
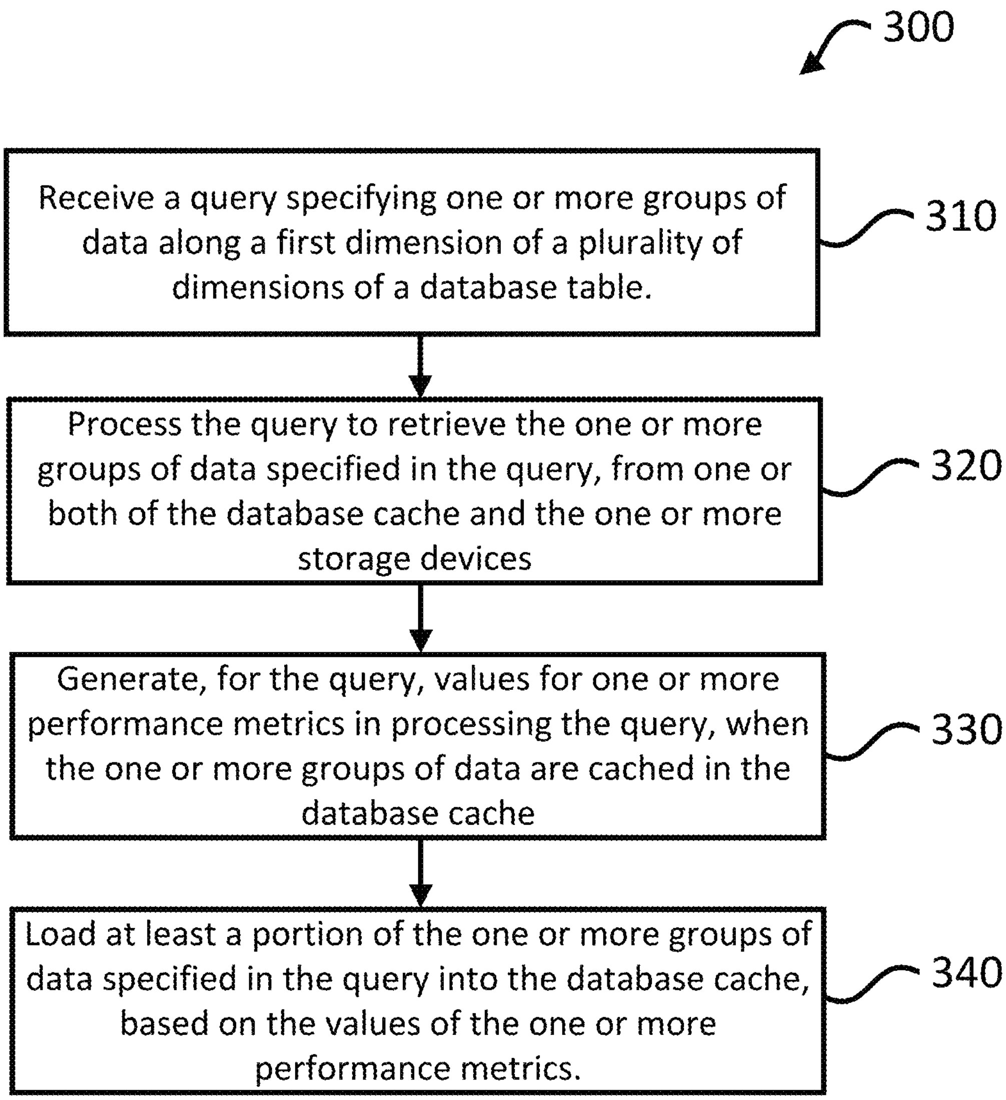
FIG. 3 is a flowchart of an example process for autonomous column selection for populating a columnar cache, according to aspects of the disclosure.

FIG. 3 is a flowchart of an example process 300 for autonomous column selection for populating a columnar cache, according to aspects of the disclosure.

A DBMS receives a query specifying groups of data along a first dimension of a plurality of dimensions of a database table, according to block 310. The groups of data can be columns. The query can also specify column sets including multiple columns. The first dimension of the plurality of dimensions can be a column direction of table data.

The DBMS processes the query to retrieve the groups of data specified in the query, from one or both of the database cache and storage devices of a database maintained by the DBMS, according to block 320. As part of retrieving the groups of data, the DBMS can receive and execute a query execution plan. The query can be one of multiple queries executed as part of a workload.

The DBMS generates, for the query, values for performance metrics in processing the query, when the groups of data are cached in the database cache. The query can be one of a set of queries sampled by the DBMS from the multiple queries executed as part of an on-going workload. The DBMS can generate values for performance metrics for the sampled queries over a period of time, for example 24 hours, before caching data into the database cache based on a selection of column data.

The values of the performance metrics are used to generate a performance benefit for the DBMS. An example process for generating a performance benefit of caching data specified in a query is described herein with reference to FIG. 5.

Example performance metrics include: an amount of time between receiving the query by the processors and delivering a response to the query, the number of processing cycles by the processors to resolve the query, and the number of operations performed by the processors to resolve the query.

The DBMS loads at least a portion of the groups of data specified in the query into the database cache, based on the values of the performance metrics, according to block 340. The DBMS caches are based on a performance benefit calculated using values for the performance metrics and representing the improvement of the DBMS by caching data specified by the query.

For example, certain columns or column sets specified in the query are selected by the DBMS for caching based on the columns or column sets providing the highest performance benefit to the DBMS during execution of a workload, subject to a number of constraints.

After loading the groups of data, in some examples the DBMS can apply a decay value to the performance benefit of the groups of data. The decay value reduces the impact of the groups of data on the next column selection, for example the next time the DBMS performs the process 300. The decay can be reduced over time, for example exponentially with each instance of the DBMS performing the process 300. The decay value reduces the impact of the respective performance benefits of the groups of data in the next column selection, to prevent the groups of data from overshadowing other potential groups of data that can improve DBMS performance when cached.

Figure 4:
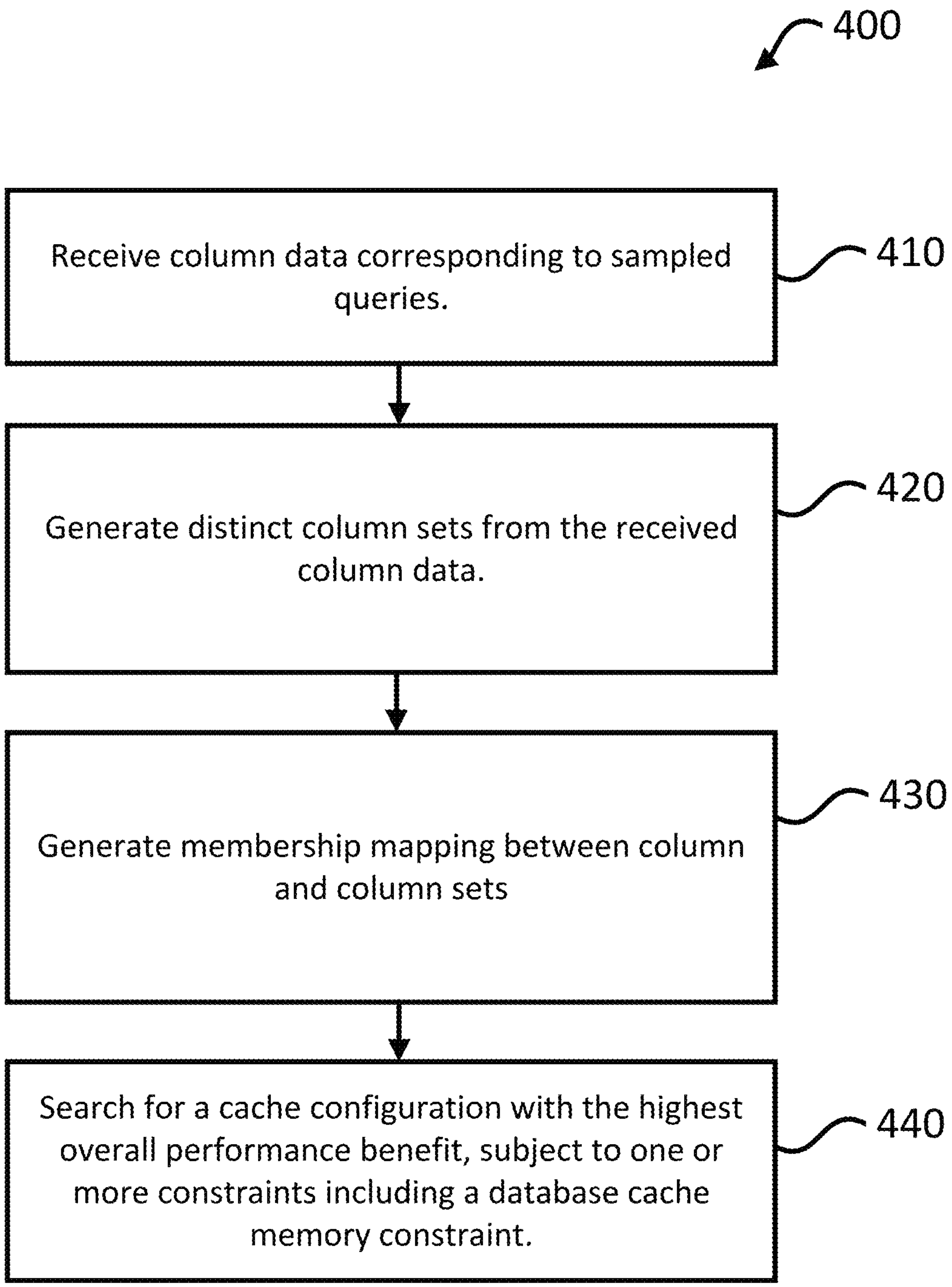
FIG. 4 is a flowchart of an example process for selecting columns for populating into a columnar cache.

FIG. 4 is a flowchart of an example process 400 for selecting columns for populating into a columnar cache.

In general, the DBMS selects columns based on an optimization process to identify a cache configuration of columns with the highest overall performance benefit, subject to a number of constraints. In some examples, the DBMS models and solves for column selection using a mixed-integer program. A mixed-integer program is a program or model in which variables for optimizing are integer values.

The DBMS can run an optimization process over a mixed-integer program as described presently. The DBMS can iterate through the optimization process until meeting stopping criteria. The stopping criteria can be, for example, a threshold improvement of a candidate configuration identified during the search at a current iteration versus a previous iteration, a maximum number of iterations performed, etc.

As in other types of optimization processes, the DBMS sets an objective and constraints. The objective is to select a cache configuration from a set of candidate cache configurations with the highest overall performance benefit, without violating a number of different constraints. One example constraint is a memory constraint on the database cache size. A cache configuration cannot exceed the memory available in a database cache.

A candidate cache configuration is a potential cache configuration that can be cached in the database cache. The candidate cache configuration can include any column or column set referenced in a set of sampled queries. The size of a candidate cache configuration is constrained by the size of the database cache.

The DBMS can model a candidate cache configuration as a Boolean vector C, where each element $c_i$ corresponds to a distinct column. A value of one in an element $c_i$ indicates that the corresponding column is in the candidate cache configuration. A value of zero in the element $c_i$ indicates that the corresponding column is not in the cache configuration. Put another way, each element $c_i$ of vector C of the candidate cache configuration can be represented as:

$c_i$=1 if and only if it is included in a cache configuration, otherwise 0

In accordance with FIG. 4, the DBMS receives a data structure Q of column data corresponding to sampled queries of a workload, according to block 410. Each query $q_i$ is a query to columns, or column sets of columns from the same relation or table.

The DBMS generates distinct column sets from the received column data, according to block 420. The DBMS can process each query $q_i$ of a workload and generate a corresponding data structure S representing each distinct column set $s_i$ queried in the workload. For example, the data structure S representing each distinct column set $s_i$ can be a Boolean vector, in which the value of each distinct column set $s_i$ is equal to one if the column set $s_i$ is part of a cache configuration, and zero otherwise. Put another way, each column set $s_i$ of vector S of the cache configuration can be represented as:

$s_i$=1 if and only if it is included in the cache configuration, otherwise 0

A column set can be represented as a bitmap, in which each element in the map corresponds to a respective column, and whether or not the column is in the column set. For the DBMS to select the columns to populate from the column sets, the DBMS generates a membership mapping between columns and column sets, according to block 430. A membership mapping can be a matrix M such that for each element $m_{ij}$ in the matrix M, a value of one indicates that column $c_i$ is a member of column set $s_j$. A value of zero indicates that column $c_i$ is not a member of column set $s_j$.

For all columns $c_i$ in cache configuration C, the column sets in data structure S indicate if a column is included in a cache configuration. If a column is included in multiple column sets, only one of the column sets needs to be included in the cache configuration for the column to be considered in the cache configuration. The DBMS can model each column $c_i$ as a Boolean variable with constraints, as follows:

for each $c_i$ in $C$: $c_i \geq m_{ij} * s_j$ for all $j$

The DBMS, using the membership map, searches for the cache configuration with the highest overall performance benefit, subject to constraints including a database cache memory constraint, according to block 440.

Each column $c_i$ can have an associated memory cost of including $c_i$ in a cache configuration, which can be indicated as $MEM_i$. The DBMS can receive a predetermined constant representing the maximum size of a cache configuration. The predetermined constant can be based on the size of the database cache but may be smaller than the size of the database cache in some examples. If the predetermined constant is called MEMORY_SIZE, then one example formulation of the memory constraint can be:

$\text{sum}_i[c_i*\text{MEM}_i] \geq \text{MEMORY\_SIZE}$

Where $\text{sum}_i[c_i*\text{MEM}_i]$ is the sum of the product of each $c_i$ and the associated memory cost $MEM_i$. Because $c_i$ is either zero or one, the memory cost for each column in the configuration is added together.

As described herein, the performance benefit can be per-column set or per-query. Depending on how the performance benefit is formulated, the objective of the search by the DBMS can be formulated in different ways.

For example, performance benefit can be based on the performance benefit of each column set. An example process for generating the performance benefit of a column is described herein with reference to FIG. 5.

Let the vector B be a vector of column set benefits. Each $b_i$ in B represents the performance benefit of a column set $s_j$ across all sampled queries. If a column set appears in multiple queries, the performance benefit for the column set is added up for each query and stored as a corresponding constant $b_i$. The objective (subject to the constraints, including the memory constraint), can be to search for a cache configuration with the highest performance benefit over all column sets in the cache configuration. The objective can be formulated, for example, as:

$\text{Maximize}[\text{sum}_i[b_j*s_j]]$

By modeling performance benefits on a column-set basis, the DBMS can perform the search more efficiently, as performance benefits for each sampled query do not need to be stored. However, in some examples, performance benefits are determined per query to better isolate and identify benefits for certain cache configurations over certain types of queries. This approach may be favorable for some workloads, for example where a particular query is repeated many times.

In the following examples in which each performance benefit is modeled per query, let matrix B be a 2D matrix representing column set benefits for each query. Each element $b_{kj}$ in the matrix B represents a constant indicating the performance benefit of a column set $s_i$ to query k, if column $s_i$ is included in a cache configuration for populating the database cache. Since a query may access multiple relations or tables, the performance benefit to an individual query $q_k$ can be formulated as:

$\text{sum}_i[b_{kj}*s_j]$

The objective can be formulated, for example, as:

$\text{Maximize}[\text{sum}_k[\text{sum}_j[b_{kj}*s_j]]$

In other words, the objective of the DBMS can be to select column sets to maximize the performance benefit for each sampled query.

The matrix B representing the benefits of each column set for a given query q may be sparse, for example because few column sets, if cached, have any performance benefit for the given query. To account for query frequency, a weight vector can be added to bias a query cost. In some examples, the objective can be formulated, for example, as:

$\text{Maximize}[\text{sum}_k[w_k*\text{sum}_j[b_{kj}*s_j]]$ where each query k corresponds to a weight $w_k$ for a query k. The weights can be a predetermined value or adjusted iteratively during optimization by the DBMS.

Figure 5:
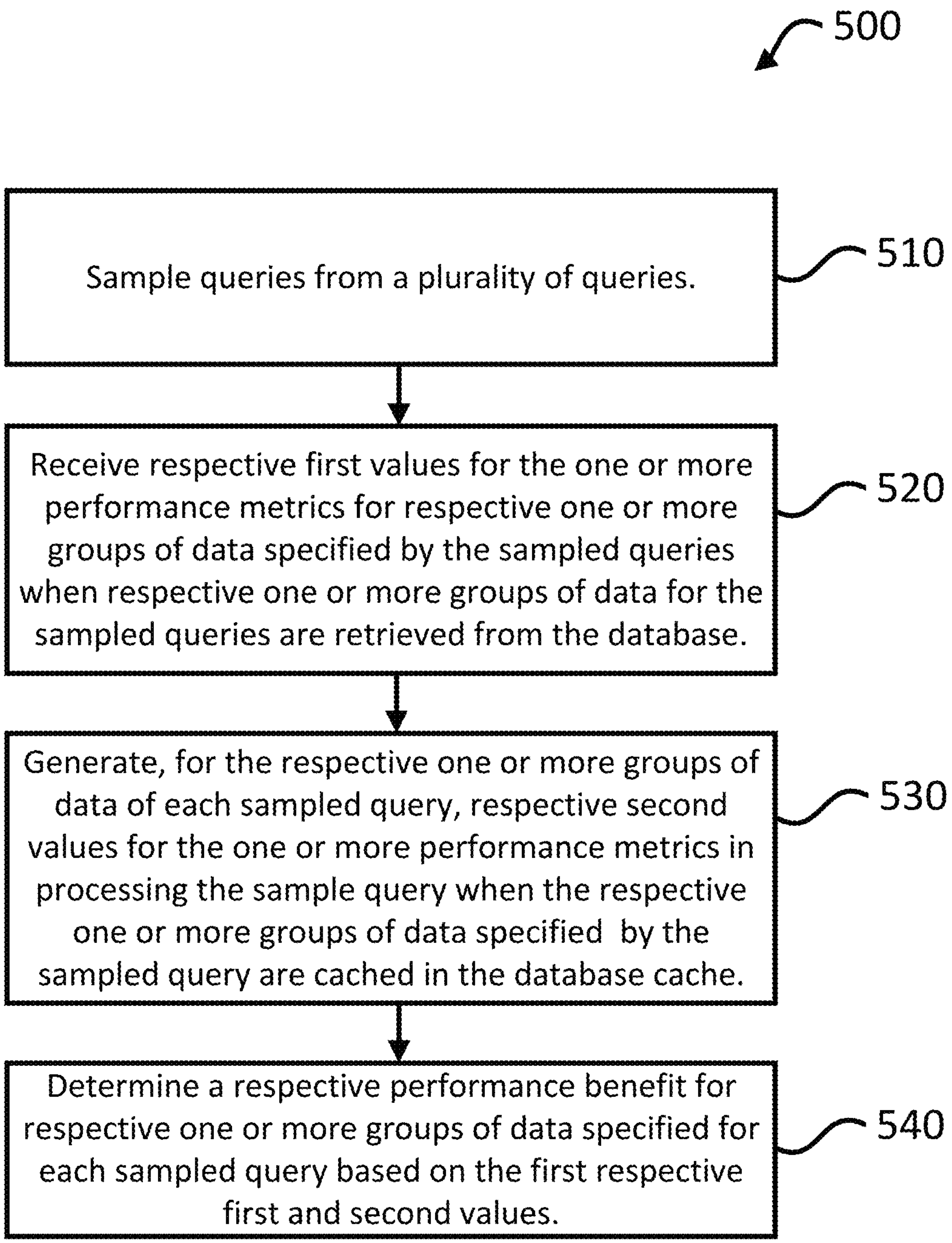
FIG. 5 is a flowchart of an example process for generating the performance benefit of a column set.

FIG. 5 is a flowchart of an example process 500 for generating the performance benefit of a column set. As described herein, groups of data can refer to columns, and a collection of columns is a column set. As also described with reference to FIGS. 3 and 4, the DBMS can identify column sets from column data specified in a query, as columns from a common table or relation.

The DBMS samples queries from queries of an executed workload, according to block 510. The sampling can be random, and the rate of sampling can be predetermined or provided as input to the DBMS. An example sampling rate can be 1% of all queries, but more or fewer queries can be sampled from implementation-to-implementation. As part of randomly sampling the queries.

The DBMS receives respective first values for the performance metrics for the sampled queries when respective groups of data for the sampled queries are retrieved from the database, according to block 520. For example, the DBMS records the computational cost and execution time of scanning a database for data specified in a sampled query. The DBMS can retrieve, from a query execution plan of a sampled query, an estimated or actual cost or execution time for executing scan operations represented by scan nodes in the plan.

In addition to the performance metrics described herein, the performance metrics can include any metrics the DBMS is configured to generate for evaluating the performance of operations represented by nodes of a query execution plan. For example, if the DBMS implements functionality to return a query execution plan with metadata corresponding to characteristics of executing a query according to the plan, that metadata can also make up at least some of the performance metrics.

The DBMS generates, for each sampled query, respective second values for the performance metrics in processing the sampled query when the respective groups of data specified in the sampled query are cached in the database cache, according to block 530. The DBMS can generate query execution plans for the sampled queries to include scan nodes representing columnar cache scanning, instead of row-store database scanning. Each columnar cache scan node can be mapped to a corresponding scan node for the query execution plan executed as part of resolving the sampled query. The DBMS can estimate the second values of the performance metrics, for example using any of a variety of processes for estimating query execution plans before being executed (referred to in some systems as "what-if?" analysis).

To improve memory utilization, sampled queries are temporarily stored, processed for performance metric values, and subsequently discarded. The DBMS can maintain a queue of sampled queries to process, according to blocks 510-530 described herein. The DBMS can perform the process 500 as a background process for a predetermined period of time, for example 24 hours. After the predetermined period of time has elapsed, the DBMS can select columns to populate in the cache, described herein with reference to FIGS. 3 and 4.

The DBMS determines a respective performance benefit for the respective groups of data specified for each sampled query, based on the respective first and second values, according to block 540. One example formulation of the performance benefit can be:

$$\text{time}_{DB} * \left(1 - \frac{\text{cost}_{cache}}{\text{cost}_{DB}}\right)$$

$\text{time}_{DB}$ is the value of a performance metric corresponding to the time for retrieving specified data of the sampled query, $\text{cost}_{cache}$ is the value of a performance metric corresponding to the computational cost of retrieving the specified data from the cache, and $\text{cost}_{DB}$ is the value of a performance metric corresponding to the computational cost of retrieving the specified data from the database. Other formulations of the performance benefit are possible.

For example, query 1 references a single column 1. The time to retrieve column 1 is measured as 5.464 milliseconds, while the cost to retrieve column 1 from the database is 2049.55 milliseconds. The cost to retrieve column 1 can be obtained by the DBMS or a query planner configured to generate query execution plans and to retrieve statistics, such as computational cost or time to retrieve data, according to the query execution plan. The DBMS estimates the cost of retrieving column 1 from the database cache as 27.76. Therefore, from the example formulation, above, the performance benefit of column 1 (a column set including a single column, in this example) is:

$$5.464 * \left(1 - \frac{27.76}{2049.55}\right) = 5.390$$

The DBMS can aggregate performance benefits for data of each sampled query into an aggregation of performance benefits, represented in a global map along with identifiers for each group of data referenced in the sampled queries. If the same column or column set is referenced for multiple sampled queries, then the performance benefit calculated for the column set for each of the sampled queries is added.

For example, for query 1, columns 1, 2, and 3 are referenced, and in query 2, columns 1, 4, and 5 are referenced. Assume the performance benefit for column 1 in query 1 is 5.390 milliseconds, as in the example above, and the performance benefit for column 1 in query 2 is 4. Therefore, the total performance benefit for column 1 is 9.390 (5.390+4). The DBMS can update the global map to reflect the aggregate performance benefit of column 1.

If a column set is referenced in multiple sampled queries, then the aggregate performance benefit of the column set can also be the sum of the performance benefit of the column set for each sampled query.

Hypothetical Columnar Units and Estimating Cache Configuration Performance with Invalidated Blocks At least in some examples, the estimation of the performance benefit for each column set by the cache population engine is affected by the presence of invalidated blocks in the column set. However, after populating the database cache, the DBMS may have to fetch blocks from a row store when invalid blocks are encountered in the database cache. Blocks in the cache may become invalid as data in the corresponding base table for the blocks is manipulated, for example by adding, removing, or modifying records in the database. Estimating the performance benefit of certain column sets in the cache can be inaccurate in those cases, because the performance loss of caching column data having invalidated blocks is not accounted for when the performance benefit is estimated before cache population.

As described herein, the DBMS estimates the performance benefit of caching column data in the database cache with invalid blocks before the column data is populated. To account for potential performance loss from invalid blocks, in some examples the DBMS is configured to generate hypothetical columnar units quantifying the number of invalidated blocks within a range of blocks in queried tables or relations of the database, before populating the database cache according to a cache configuration. Hypothetical columnar units can account for performance loss from caching certain column data with invalid blocks before the column data is populated into the database cache.

A refresh on a columnar unit in the database cache fetches blocks from disk and formats the data into columnar format. After the refresh completes, all blocks become valid and future queries will be processed in the database cache, without needing to go to disk. Accounting for this I/O cost of fetching invalid blocks from the row store can improve the accuracy of a measured performance benefit for cache configuration before column sets for that cache configuration are populated in the database cache.

Before populating the cache, the DBMS can generate data representing a hypothetical relation having hypothetical columnar units. A hypothetical columnar unit contains a bitmap for blocks in a range, e.g., block number 0 to block 4096. The bit is 1 if the block is invalid. The hypothetical columnar unit can also contain statistics about the corresponding blocks represented by the hypothetical columnar unit, such as access count for the blocks, or last access time for the blocks. The hypothetical columnar unit is a representation of the corresponding blocks and is used by the DBMS to estimate performance costs of caching the corresponding blocks, before populating the database cache. A hypothetical columnar unit incurs low memory overhead since it represents each block in a range as a single bit. For example, for a two-terabyte database with eight kilobyte pages, the DBMS consumes a total of 32 KB for the hypothetical columnar units representing data in the database.

A hypothetical relation represents a database table or relation and is used to generate hypothetical columnar units by the DBMS. The hypothetical relation is used to estimate the performance of a corresponding database table or relation for the hypothetical relation before the corresponding database table or relation is cached. As described herein with reference to FIG. 6A, the hypothetical relation is periodically refreshed to simulate the performance costs of refreshing cached data.

Figure 6A:
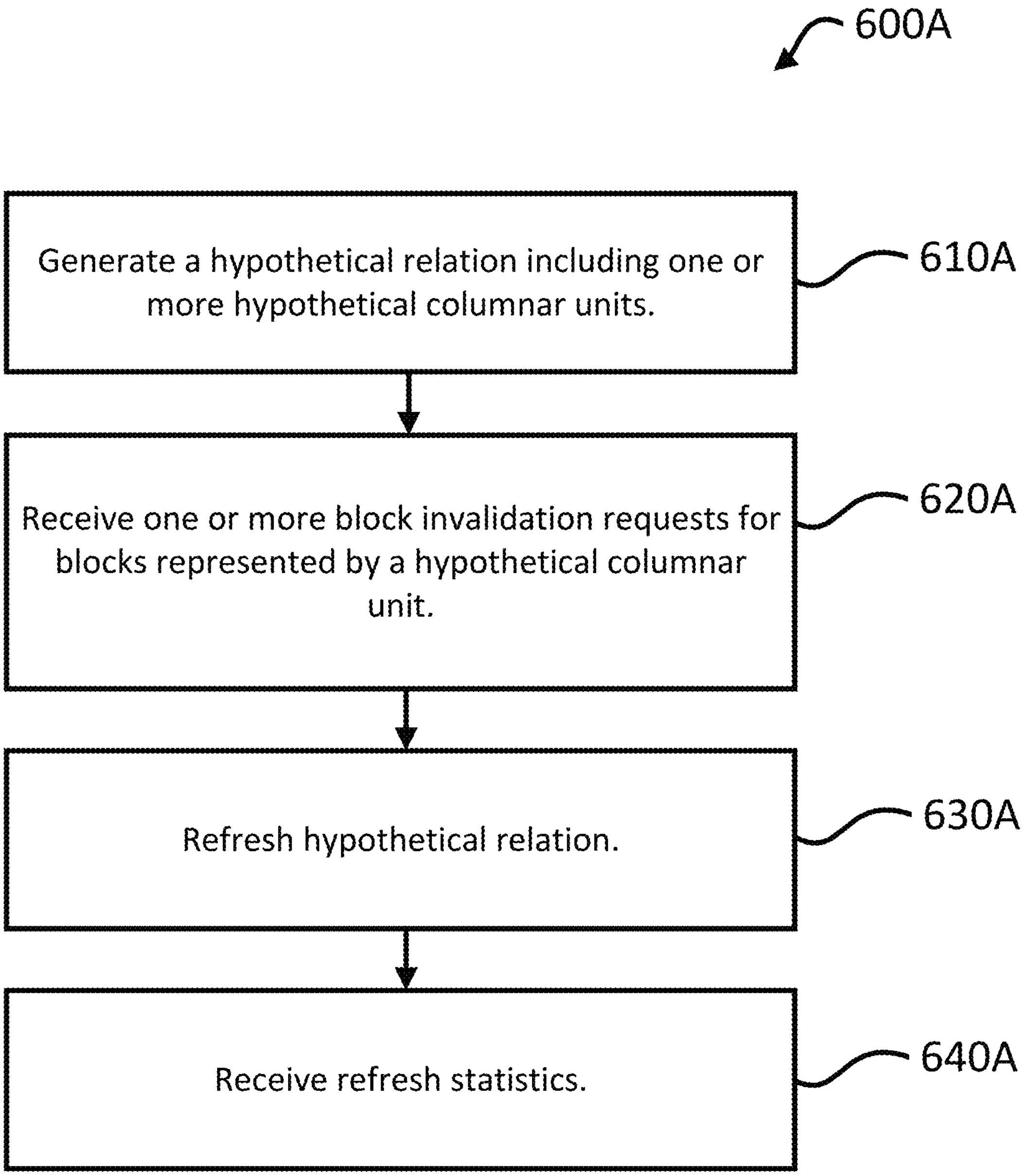
FIG. 6A is a flowchart of a process for refreshing a hypothetical relation, according to aspects of the disclosure.

FIG. 6A is a flowchart of a process 600A for refreshing a hypothetical relation, according to aspects of the disclosure.

The DBMS generates a hypothetical relation including hypothetical columnar units, according to block 610A. The DBMS can create a hypothetical relation when a database table or relation is accessed because blocks are invalid in the database cache, or if the DBMS accesses the table or relation while generating performance metrics for different column sets, as described herein with reference to FIG. 5.

To generate a hypothetical relation, the DBMS retrieves the number of rows or blocks in the corresponding base relation, to create hypothetical columnar units. The DBMS does not fetch any rows from the base table, as part of generating the hypothetical relation. To simplify generation, the DBMS can assume the number of rows per block in the base table or relation is evenly divided over the number of blocks in the base table or relation. This assumption can be made because hypothetical columnar units as described herein maintain a bitmap on blocks and total number of tuples, so the assumption can allow for calculating the number of valid tuples in the valid blocks.

The DBMS receives block invalidation requests for blocks represented by a hypothetical columnar unit, according to block 620A. A block invalidation request is a request to mark a block in the database cache as invalid, for example due to an update to the corresponding block in a table or relation. As part of processing the block invalidation request, the DBMS can mark the block as invalid in a corresponding hypothetical columnar unit.

The DBMS refreshes the hypothetical relation, according to block 630A. The hypothetical relation may be refreshed periodically, also, for example, according to experimentally identified times based on how often the DBMS refreshes "real" relations in the database. The refresh rate can be an average value of refresh rates for different relations across the database, as another example. The time taken to refresh the hypothetical relation is tracked and can be used as part of estimating the performance benefit for caching column data of the relation, for example as described herein with reference to FIG. 600B.

To refresh a hypothetical relation, the DBMS checks to refresh each of the hypothetical columnar units of the hypothetical relation. During a refresh of a hypothetical relation, the DBMS checks whether each hypothetical columnar unit in the hypothetical relation should be refreshed. For example, the DBMS refreshes a hypothetical columnar unit when its number of invalid blocks exceeds a predetermined threshold. The DBMS performs a hypothetical refresh on a hypothetical columnar unit, to simulate the real refresh if the columnar unit is populated in the cache. A refresh on a hypothetical columnar unit only updates the estimated completion time of a hypothetical columnar unit based on refresh rate, which may be determined, for example, experimentally offline, such as a number of blocks per second.

While refreshing the hypothetical columnar units, the DBMS maintains a running end time R representing the end time of the refresh for the hypothetical relation. The end time R simulates the queuing effect of a hypothetical refresh. The DBMS can receive a predetermined amount of time for refreshing a hypothetical columnar unit. When a hypothetical columnar unit exceeds a threshold number of invalid blocks, for example a percentage threshold, the end time R for the hypothetical refresh is extended by the predetermined amount of time provided for refreshing the hypothetical columnar unit. For example, the end time R can be extended as follows:

$$R = (\text{current time}, R) + \text{predetermined hypothetical columnar unit refresh time}$$

where the current time is the current time at the time of the refresh.

If there is no secondary hypothetical columnar unit, then a secondary hypothetical columnar unit with refresh end time R is generated. If the current time is later than an existing secondary columnar unit's refresh end time, then the DBMS switches back to the primary hypothetical columnar unit. The refresh of a hypothetical relation is marked as complete when the refresh end time of the last hypothetical columnar unit is less than the current time.

The secondary columnar unit can be used to ensure that the refresh does not interfere with the scan. Data in the columnar unit cannot be changed if the DBMS is scanning the columnar unit at the same time. Therefore, data can be populated in the secondary columnar unit. Scans will not reference secondary columnar units. Once the population of the secondary columnar units is complete, the DBMS can atomically switch the secondary columnar unit to the primary columnar unit and discard the secondary columnar unit.

As part of refreshing a hypothetical columnar unit, the DBMS retrieves refresh statistics, according to block 640A. The refresh statistics represent the estimated time to refresh the hypothetical columnar unit, which can be used to generate an estimated performance benefit.

The refresh on a hypothetical columnar unit is complete when the DBMS retrieves the number of invalid blocks represented by the hypothetical columnar unit while estimating the performance benefit for column data represented by the hypothetical columnar unit. If the estimated completion time is in the past, the refresh is complete and marks all blocks in the hypothetical columnar unit as valid. For example, if refreshing a 32 MB columnar unit takes 3.2 seconds, then, a refresh on a hypothetical columnar unit will also take 3.2 seconds. After 3.2 seconds, the DBMS marks all blocks in the hypothetical columnar unit as valid. Then, the estimated benefit of a query using the columnar unit is adjusted accordingly, for example as described herein with reference to FIG. 6B.

Figure 6B:
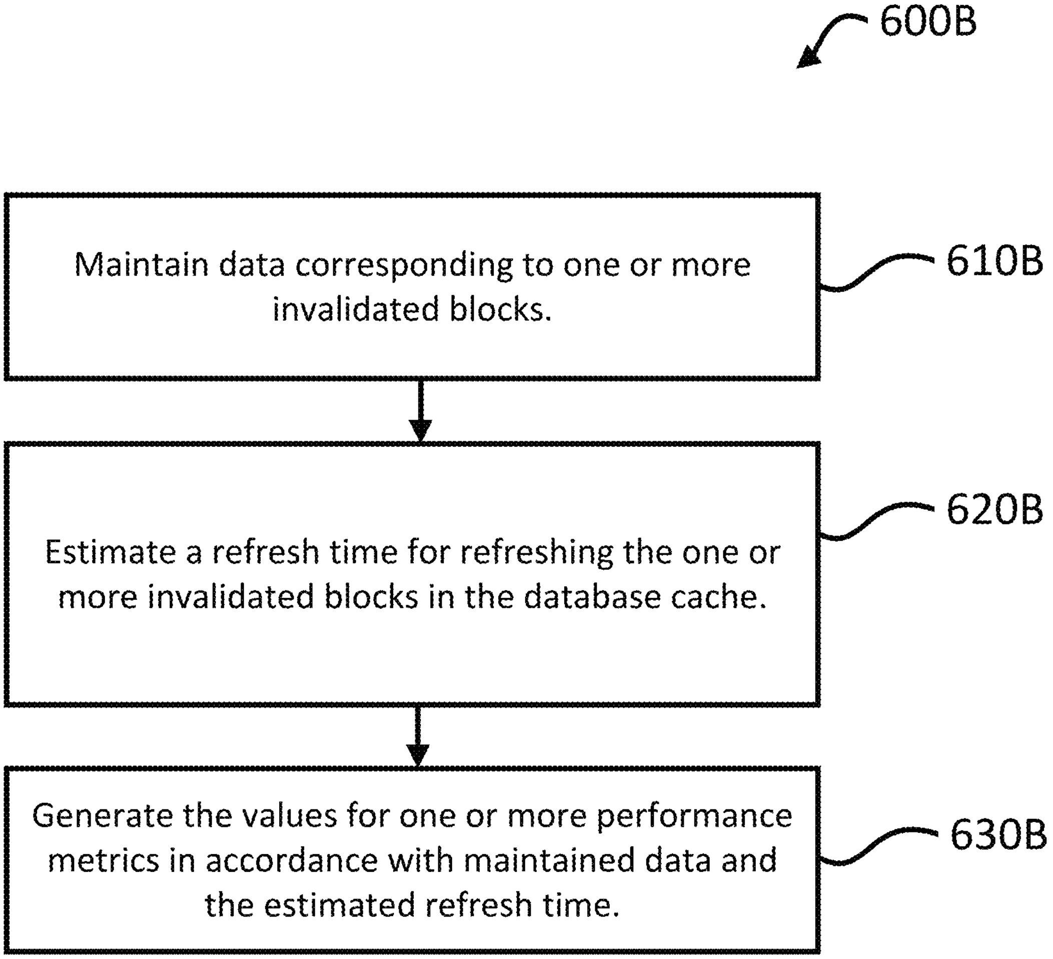
FIG. 6B is a flowchart of an example process for generating performance metrics for a cache configuration using estimated cache refreshes.

FIG. 6B is a flowchart of an example process 600B for generating performance metrics for a cache configuration using estimated cache refreshes. The performance metrics can be used by the DBMS to search for a maximum- or minimum-valued cache configuration for caching.

The DBMS maintains data corresponding to invalidated blocks in a table or relation, according to block 610B. For example, the DBMS can generate a hypothetical relation with hypothetical columnar units, as described herein with reference to FIG. 600A.

The DBMS estimates a refresh time for refreshing the invalidated blocks in the database cache, according to block 620B. During the performance estimation, or "what-if" analysis, the DBMS can retrieve hypothetical relation refresh statistics, for example by performing the process 600A.

The DBMS generates, for the query, the values for the performance metrics in accordance with the maintained data and the estimated refresh time, according to block 630B. The estimated refresh time affects the performance of the data represented by the hypothetical columnar units. In other words, by accounting for the estimated refresh time, the DBMS can more accurately estimate the performance benefit of column data before it is cached, at least because the performance benefit can reflect the impact on performance of caching the column data and later retrieving data from the database due to invalid blocks in the column data.

Column Selection by Elimination of Existing Cached Data

In some examples, the cache population engine can measure the performance benefit of column sets already populated in the database cache. The cache population engine can sample queries to cached columns to estimate the performance benefit of the DBMS in resolving those queries if the requested data was not cached. This estimated performance can be used in addition or as an alternative to column selection performance benefit estimation, to search for cache configurations, as described herein with reference to FIGS. 3-5.

Similar to as described herein with reference to FIG. 3, the performance benefit of the currently cached column data can be exponentially decayed between iterations of performing column selection. In some examples, the DBMS can determine a first group of data of the groups of data in the database cache, and generate, for the query, values for the performance metrics when the first group of data is not cached in the database cache.

The DBMS can process cached data to determine a respective performance benefit as a background process, for example while the DBMS receives and resolves queries.

Cache Data Selection with Compression

In some examples, column data in the database cache can be compressed to increase the amount of column data that can be stored in the cache. The cache population engine can compress data at different compression levels. Higher compression levels cause the cache population engine to compress data with a higher compression ratio, at the cost of additional time to retrieve the data when queried. The cache population engine can be configured to augment the cache configuration to specify at which level of compression each column populated in the database cache should be compressed. The cache population engine can determine at which compression levels to cache column data based on the performance benefit of the DBMS when caching the column set according to different levels of compression.

The DBMS can support a variety of different compression processes, such as dictionary encoding, dictionary encoding with zstandard (zstd), dictionary encoding with zlib, etc. For purposes of description, it is assumed that the DBMS implements three levels of compression (compression levels 1-3), where compression level 1 has the lowest average compression ratio of the three levels, ascending to compression level 3 with the highest average compression ratio. More or fewer compression levels are possible from implementation-to-implementation.

When configured for cache configuration with compression, the DBMS can receive, as input, candidate columns and column sets of the sampled queries. Each column can be represented by a data structure, including, for example, a column identifier, an estimated column size after compression, and a compression level. Similarly, a column set can be represented by a list of each column in the set, its respective compression level, and a performance benefit when the column set is cached.

In some examples, additional constraints can be added, for example to reduce computational complexity in searching for the candidate configuration, Example additional constraints include requiring that a selected column in the configuration have only one compression level. Another example constraint can be that a selected column set must be selected with all of its columns having a corresponding compression level or lower (for example, a column set with compression level 2 can have only columns with compression levels 2 or 1).

Other constraints include, for example, when selecting a column, the column set containing the column with the same or higher compression level must also be selected (for example, if a column with compression level 2 is selected, and that column is a member of a column set with compression level 2 and compression level 3, then at least one of the two column sets must also be selected for the candidate configuration). In other examples, instead of selecting between one of the two column sets containing the selected column, both column sets are selected. The DBMS still selects column sets with a higher overall performance benefit, since its objective is to maximize performance benefit. For example, if a column set with a level higher than 1 provides an overall higher benefit, the DBMS may include the column set but is flexible to select columns with lower levels, as well.

The restriction of compressing each column of a column set to the same compression level can be added to reduced computational complexity of iterating through each possible combination of column and compression level. For instance, given a column set of N and three compression levels available, $3^N$ possible column sets are possible. In other examples, this restriction can be reduced, for example by allowing for column sets of the same or smaller compression level for each column.

As with column selection without compression, described with reference to FIGS. 3-5, the memory size of the selected columns in a candidate configuration must be less than or equal to a given cache size.

The DBMS can augment existing processes, such as the process 300, to generate values for performance metrics based on different compression levels for cached data. In some aspects of the disclosure, the DBMS can augment the block 330 in FIG. 3, to generate performance metrics also reflecting the performance of cached data according to different compression levels. For example, the DBMS generates, for each compression level, values for performance metrics for groups of data in which all the groups of data are cached and compressed at the compression level. For example, the groups of data can form a column set, with each column in the column set compressed at the same compression level.

The values for the performance metrics can be used to generate a performance benefit for a column set, as well as used as part of searching for a cache configuration, for example using the process 400 described with reference to FIG. 4.

In one example, consider a column set having columns A, B, C, with three possible compression levels. For instance, shown in TABLE 1:

TABLE 1

| Column Set | Column Compression | | | Performance Benefit |
|---|---|---|---|---|
| 1 | A:1 | B:1 | C:1 | 100 |
| 2 | A:2 | B:2 | C:2 | 10 |
| 3 | A:3 | B:3 | C:3 | 1 |

If one column set is selected, the DBMS will enable lower compression levels for individual columns. If column set 3 is part of the cache configuration for populating the cache, then columns A:1, B:2, and C:3 may be enabled within column set 3, instead, for a higher performance benefit. If column set 1, then columns A:1, B:1, and C:1 must be selected. In other examples, each column in a column set has the same compression level.

In some examples, the cache population engine can receive additional constraints, for example from the user, specifying variations when only a single compression level is applied. For instance, if the cache population engine receives input specifying column A level 1 and column B at level 2, then the cache population engine changes each candidate selection including B to include B at level 2.

Columnar Unit Selection

In some examples, the cache population engine 100 can also determine how many invalid blocks or a ratio of invalid blocks to valid blocks in queried data, to determine whether to include those column sets in the database cache 110. The DBMS in some examples can receive as input a maximum invalid block threshold for allowing a corresponding column from being included in the database cache 110.

In some examples, the cache population engine can populate a database cache with subsets of column data. The cache population engine can filter out columnar units with a quantity of invalidated blocks meeting a predetermined threshold. The cache population engine can also filter out columnar units to favor other columnar units that are accessed more frequently in response to queries to the database. To identify columnar units for filtering out, the cache population engine can monitor block ranges accessed by the DBMS, as well as column data accessed within those block ranges. As part of generating a cache configuration, the cache population engine can filter out block ranges.

By monitoring and filtering out columnar units with many invalidated blacks, the DBMS can further improve performance of query resolution by increasing the utilization of the database cache, over accessing the database. Columnar units with blocks that are frequently invalidated incur an overhead with no performance benefit.

In other examples, the DBMS can also determine which columnar units of a relation or table are accessed more frequently than others. For example, the first columnar unit of a relation or table may be disproportionately accessed more frequently during query resolution, over other columnar units. In that example, the DBMS may populate only the first columnar unit from the table or relation. In general, workloads can exhibit a skewed pattern of data access, such as accessing the first columnar unit more frequently than others. Populating a subset of data will achieve the maximum performance benefits.

In some examples, the DBMS can maintain a heatmap on block ranges during sequential scanning. The DBMS can identify frequently read block ranges with many valid blocks, for example, exceeding a threshold. it then adjusts their relevant columnar sizes accordingly. Next, it selects the columns and populates the columnar units for the considered block ranges. The DBMS generates columnar units with min/max values only for the rest of the block ranges. The DBMS can determine values of performance metrics for the created columnar units, as described herein with reference to FIGS. 3-5.

In some examples, the DBMS determines, for a first group of data, whether the group of data meets a threshold quantity of valid blocks of data; and in response to the determination that the first group of data does meet the threshold quantity, loads a portion of the first group of data to the database cache that does not include invalidated blocks. The DBMS can perform the determination as part of loading the cache, as described herein with reference to FIG. 3. For example, the DBMS can filter out groups of data as described herein, before determining values for the performance metrics for the remaining groups of data.

Example Computing Environment

Figure 7:
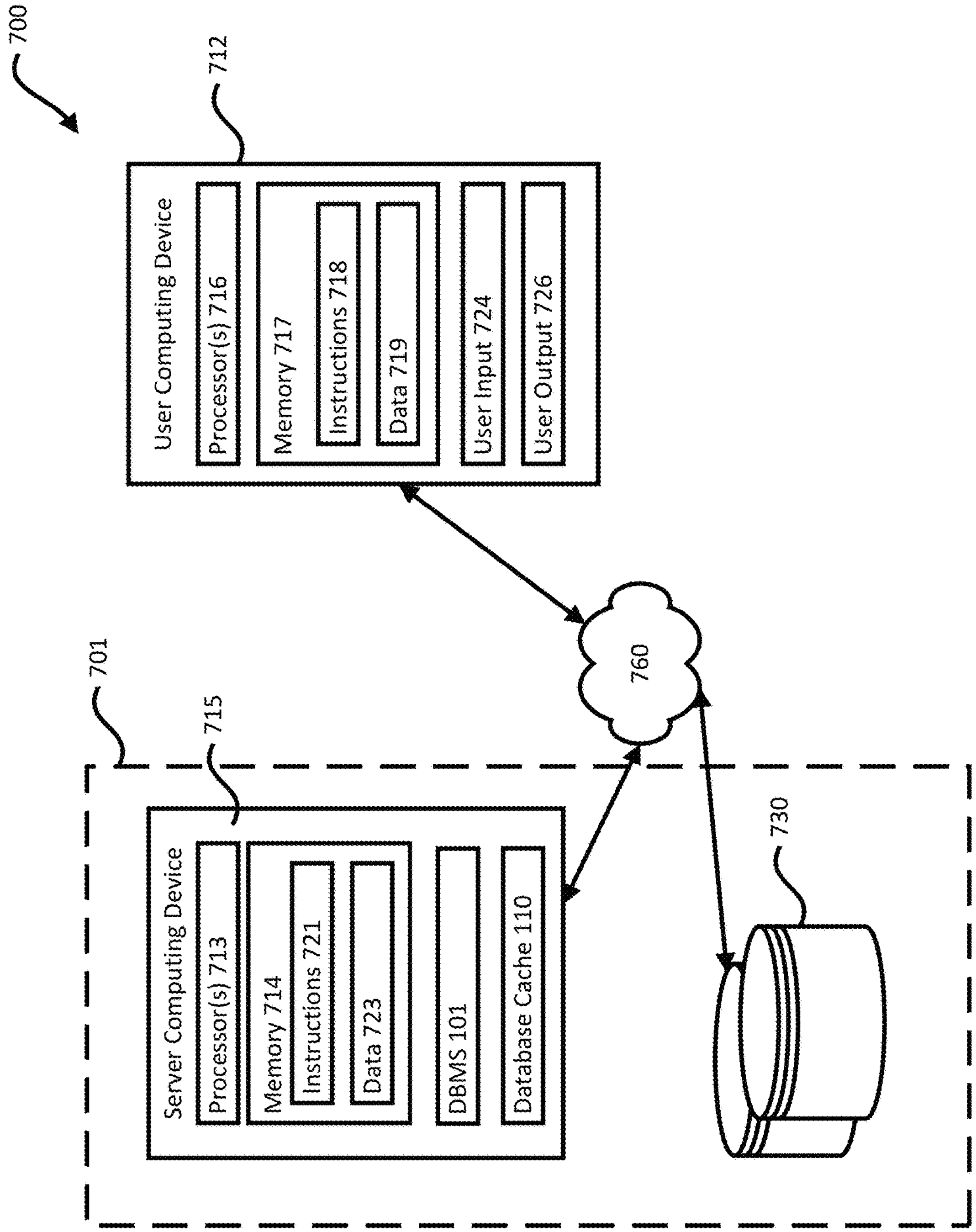
FIG. 7 is a block diagram of an example computing environment implementing the example database management system.

FIG. 7 is a block diagram of an example environment 700 for implementing the DBMS 101. The DBMS 101 can be implemented on one or more devices having one or more processors in one or more locations, such as in server computing device 715. User computing device 712 and the server computing device 715 can be communicatively coupled to one or more storage devices 730 over a network 760. The storage device(s) 730 can be a combination of volatile and non-volatile memory and can be at the same or different physical locations than the computing devices 712, 715. For example, the storage device(s) 730 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 715 can include one or more processors 713 and memory 714. The memory 714 can store information accessible by the processor(s) 713, including instructions 721 that can be executed by the processor(s) 713. The memory 714 can also include data 723 that can be retrieved, manipulated, or stored by the processor(s) 713. The memory 714 can be a type of non-transitory computer readable medium capable of storing information accessible by the processor(s) 713, such as volatile and non-volatile memory. The processor(s) 713 can include one or more central processing units (CPUs), graphic processing units (GPUs), field-programmable gate arrays (FPGAs), and/or application-specific integrated circuits (ASICs), such as tensor processing units (TPUs).

The instructions 721 can include one or more instructions that when executed by the processor(s) 713, cause the one or more processors to perform actions defined by the instructions. The instructions 721 can be stored in object code format for direct processing by the processor(s) 713, or in other formats including interpretable scripts or collections of independent source code modules that are interpreted on demand or compiled in advance. The instructions 721 can include instructions for implementing the DBMS 101 consistent with aspects of this disclosure. DBMS 101 can be executed using the processor(s) 713, and/or using other processors remotely located from the server computing device 715.

The data 723 can be retrieved, stored, or modified by the processor(s) 713 in accordance with the instructions 721. The data 723 can be stored in computer registers, in a relational or non-relational database as a table having a plurality of different fields and records, or as JSON, YAML, proto, or XML documents. The data 723 can also be formatted in a computer-readable format such as, but not limited to, binary values, ASCII, or Unicode. Moreover, the data 723 can include information sufficient to identify relevant information, such as numbers, descriptive text, proprietary codes, pointers, references to data stored in other memories, including other network locations, or information that is used by a function to calculate relevant data.

The user computing device 712 can also be configured similarly to the server computing device 715, with one or more processors 716, memory 715, instructions 718, and data 719. The user computing device 712 can also include a user output 726, and a user input 724. The user input 724 can include any appropriate mechanism or technique for receiving input from a user, such as keyboard, mouse, mechanical actuators, soft actuators, touchscreens, microphones, and sensors.

The server computing device 715 can be configured to transmit data to the user computing device 712, and the user computing device 712 can be configured to display at least a portion of the received data on a display implemented as part of the user output 726. The user output 726 can also be used for displaying an interface between the user computing device 712 and the server computing device 715. The user output 726 can alternatively or additionally include speakers, transducers or other audio outputs, a haptic interface or other tactile feedback that provides non-visual and non-audible information to the platform user of the user computing device 712.

Although FIG. 7 illustrates the processors 713, 716 and the memories 714, 715 as being within the computing devices 715, 712, components described in this specification, including the processors 713, 716 and the memories 714, 717 can include multiple processors and memories that can operate in different physical locations and not within the same computing device. For example, some of the instructions 721, 718 and the data 723, 719 can be stored on a removable SD card and others within a read-only computer chip. Some or all of the instructions and data can be stored in a location physically remote from, yet still accessible by, the processors 713, 716. Similarly, the processors 713, 716 can include a collection of processors that can perform concurrent and/or sequential operation. The computing devices 715, 712 can each include internal clocks providing timing information, which can be used for time measurement for operations and programs run by the computing devices 715, 712.

The server computing device 715 can be configured to receive requests to process data from the user computing device 712. For example, the environment 700 can be part of a computing platform 701 configured to provide a variety of services to users, through various user interfaces and/or APIs exposing the platform services.

The devices 712, 715 can be capable of direct and indirect communication over the network 760. The devices 715, 712 can set up listening sockets that may accept an initiating connection for sending and receiving information. The network 760 itself can include various configurations and protocols including the Internet, World Wide Web, intranets, virtual private networks, wide area networks, local networks, and private networks using proprietary communication protocols. The network 760 can support a variety of short- and long-range connections. The short- and long-range connections may be made over different bandwidths, such as 2.402 GHz to 2.480 GHz (commonly associated with the Bluetooth® standard), 2.4 GHz and 7 GHz (commonly associated with the Wi-Fi® communication protocol); or with a variety of communication standards, such as the LTE® standard for wireless broadband communication. The network 760, in addition or alternatively, can also support wired connections between the devices 712, 715, including over various types of Ethernet connection.

Although a single server computing device 715, user computing device 712, are shown in FIG. 7, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as computer programs, or a combination of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

With respect to the use of substantially any plural and/or singular terms herein, for example (with the term "element" being a stand-in for any system, component, data, etc.) "an/the element," "one or more elements," "multiple elements," a "plurality of elements," "at least one element," etc., those having skill in the art can translate from the plural to the singular and/or from the singular to the plural as is appropriate to the context and/or application described. The various singular/plural permutations may be expressly set forth herein, for sake of clarity and without limitation unless expressly indicated.

The invention claimed is:

1. A system comprising:

one or more processors configured to:

receive a query specifying one or more groups of data along a first dimension of a plurality of dimensions;

generate a query execution plan corresponding to the query, the query execution plan comprising query operations and an order in which the query operations are to be performed to execute the query;

generate values for one or more performance metrics based on the query operations within the query execution plan, wherein the values for the one or more performance metrics indicate an estimated change in processing performance prior to loading the one or more groups of data into a database cache, by modeling the one or more groups of data as being stored in the database cache as compared to the one or more groups of data being stored in one or more storage devices; and load at least a portion of the one or more groups of data specified in the query into the database cache when the values of the one or more performance metrics satisfy one or more performance criteria.

2. The system of claim 1, wherein the one or more groups of data are part of a first set of data represented as a cache configuration; and wherein the one or more processors are further configured to identify the cache configuration from candidate sets of data, each candidate cache configuration comprising respective one or more groups of data along the first dimension.

3. The system of claim 2, wherein in identifying the cache configuration, the one or more processors are further configured to search the candidate cache configurations for the first set of data subject to the one or more performance criteria.

4. The system of claim 3, wherein respective data represented by each of the candidate cache configurations, when cached in the database cache, consumes a respective amount of memory equal to or less than a memory capacity of the database cache.

5. The system of claim 3, wherein the one or more performance criteria comprise identifying a maximum- or a minimum-valued set of data based on respective values of the one or more performance metrics for each group of data in the identified set.

6. The system of claim 1, wherein the query received is part of a plurality of received queries; and wherein the one or more processors are further configured to:

sample queries from the plurality of received queries;

receive respective first values for the one or more performance metrics for the sampled queries when respective one or more groups of data for the sampled queries are retrieved from a database;

generate, for the respective one or more groups of data for the sampled queries, respective second values for the one or more performance metrics for the sampled queries when the respective one or more groups of data specified by the sampled queries are cached in the database cache; and determine, for the sampled queries, a respective performance benefit for the respective one or more groups of data specified in the sampled query based on the respective first and second values for the sampled queries.

7. The system of claim 6, wherein in loading at least a portion of the one or more groups of data specified in the query into the database cache, based on the values of the one or more performance metrics, the one or more processors are further configured to generate a cache configuration representing one or more selected groups of data, the groups of data selected based on the respective performance benefit for each of the one or more selected groups of data.

8. The system of claim 7, wherein the one or more groups of data are columns; and wherein to generate the cache configuration, the one or more processors are configured to:

receive column data corresponding to the sampled queries;

generate distinct column sets from the received column data;

generate a membership map between column sets and columns in the column sets; and use the membership map to search for a cache configuration with a highest overall performance benefit of columns in the cache configuration, subject to one or more constraints including a database cache memory constraint.

9. The system of claim 1, wherein the one or more performance metrics comprise at least one of:

an amount of time between receiving the query by the one or more processors and delivering a response to the query, a number of processing cycles by the one or more processors to resolve the query, and a number of operations performed by the one or more processors to resolve the query.

10. The system of claim 1, wherein in generating, for the query, the values for the one or more performance metrics, the one or more processors are further configured to:

maintain data corresponding to one or more invalidated blocks in a table of a database queried as part of the one or more groups of data;

estimate a refresh time for refreshing the one or more invalidated blocks in the database cache; and generate, for the query, the values for the one or more performance metrics in accordance with the maintained data and the estimated refresh time.

11. The system of claim 1, wherein the first dimension is a column dimension for tables in a database, wherein data in the database cache is stored along the column dimension, and wherein data in the one or more storage devices is stored along a row dimension for the tables in the database.

12. The system of claim 1, wherein in loading the one or more groups of data into the database cache, the one or more processors are further configured to compress each of the one or more groups of data according to one or more compression levels before loading the one or more groups of data into the database cache; and wherein the one or more processors are further configured to generate the one or more values for the one or more performance metrics in processing the query when each of one or more groups of data are cached in the database cache and compressed according to a respective compression level.

13. The system of claim 1, wherein in generating the values for the one or more performance metrics, the one or more processors are further configured to:

determine a first group of data of the one or more groups of data in the database cache; and generate, for the query, values for the one or more performance metrics when the first group of data is not cached in the database cache.

14. The system of claim 1, wherein in loading at least the portion of the one or more groups of data, the one or more processors are further configured to:

determine, for a first group of data, whether the first group of data meets a threshold quantity of valid blocks of data; and in response to the determination that the first group of data does meet the threshold quantity, load a portion of the first group of data to the database cache that does not include invalidated blocks.

15. The system of claim 14, wherein in generating the values for the one or more performance metrics, the one or more processors are further configured to:

track a respective rate of access of portions of the one or more groups of data in one or more storage devices; and generate, for the query, the values for the one or more performance metrics in accordance with a rate of access of a portion of data specified in the query.

16. A computer-implemented method, comprising:

receiving, by one or more processors, a query specifying one or more groups of data along a first dimension of a plurality of dimensions;

generating, by the one or more processors, a query execution plan corresponding to the query, the query execution plan comprising query operations and an order in which the query operations are to be performed to execute the query;

generating, by the one or more processors, values for one or more performance metrics based on the query operations within the query execution plan, wherein the values for one or more performance metrics indicate an estimated change in processing performance prior to loading the one or more groups of data into a database cache, by modeling the one or more groups of data as being stored in the database cache as compared to the one or more groups of data being stored in the one or more storage devices; and loading, by the one or more processors, at least a portion of the one or more groups of data specified in the query into the database cache when the values of the one or more performance metrics satisfy one or more performance criteria.

17. The computer-implemented method of claim 16, wherein the one or more groups of data are part of a first set of data represented as a cache configuration; and wherein the method further comprises identifying the cache configuration from candidate sets of data, each candidate cache configuration comprising respective one or more groups of data along the first dimension.

18. The computer-implemented method of claim 17, wherein respective data represented by each of the candidate cache configurations, when cached in the database cache, consumes a respective amount of memory equal to or less than a memory capacity of the database cache.

19. One or more non-transitory computer-readable storage media storing instructions that when executed by a system comprising one or more processors, cause the system to perform operations comprising:

receiving a query specifying one or more groups of data along a first dimension of a plurality of dimensions;

generating a query execution plan corresponding to the query, the query execution plan comprising query operations and an order in which the query operations are to be performed to execute the query;

generating values for one or more performance metrics based on the query operations within the query execution plan, wherein the values for one or more performance metrics indicate an estimated change in processing performance prior to loading the one or more groups of data into a database cache, by modeling the one or more groups of data as being stored in the database cache as compared to the one or more groups of data being stored in the one or more storage devices; and loading at least a portion of the one or more groups of data specified in the query into the database cache when the values of the one or more performance metrics satisfy one or more performance criteria.

20. The system of claim 1, wherein the one or more processors are further configured to select the query operations based on predetermined criteria, wherein the predetermined criteria corresponds to one or more of:

a use of computing resources;

a use of storage resources;

a number of operations to perform;

a total time needed to execute the query; or user input that specifies particular query operations to perform.

* * * * *